United States Patent [19]

Fox

[11] 3,921,167

[45] Nov. 18, 1975

[54] CAPACITIVE CIRCUITBOARD

[75] Inventor: Jon Edward Fox, Cary, N.C.

[73] Assignee: International Business Machines Corporation, Armonk, N.Y.

[22] Filed: June 14, 1974

[21] Appl. No.: 479,683

[52] U.S. Cl...... 340/365 C; 179/111 E; 307/88 ET; 317/101 B; 340/166 R

[51] Int. Cl.$^2$ .......... G08C 1/00

[58] Field of Search .......... 340/365 C, 365 R, 200; 317/DIG. 2, 261, 246, 249 R, 101 B; 307/88 ET, 116; 179/111 E; 333/24 C; 178/DIG. 10; 200/DIG. 1

[56] References Cited

UNITED STATES PATENTS

| | | | |
|---|---|---|---|
| 3,419,697 | 12/1968 | Gove | 200/181 |
| 3,492,440 | 1/1970 | Cerbone et al. | 179/90 |
| 3,821,491 | 6/1974 | Whetstone et al. | 179/111 E |
| 3,833,770 | 9/1974 | Atoji et al. | 179/111 E |
| 3,835,264 | 9/1974 | Overby | 179/111 E |
| 3,850,279 | 11/1974 | Kolpek | 197/19 |

FOREIGN PATENTS OR APPLICATIONS

| | | | |
|---|---|---|---|
| 814,077 | 5/1969 | Canada | 340/365 C |

*Primary Examiner*—Thomas B. Habecker
*Assistant Examiner*—James J. Groody
*Attorney, Agent, or Firm*—Edward H. Duffield

[57] ABSTRACT

Apparatus for use with capacitively coupled keyboard devices is described in which an improved circuitboard which eliminates the necessity of through-plated holes is claimed. At least one flexible dielectric substrate, and one substrate which may be flexible or rigid, are both provided with printed or etched circuit patterns and are used in a sandwich construction with insulative material between them. Pairs of capacitively couplable circuit pads result from this construction and one of the pads in each pair has a capacitively coupled output.

5 Claims, 3 Drawing Figures

CAPACITIVE CIRCUITBOARD

FIELD OF THE INVENTION

This invention relates generally to circuitboards and circuitboard manufacturing techniques. More specifically, it relates to capacitive circuitry and capacitive circuitboard devices utilized in capacitively coupled keyboards.

PRIOR ART

A wide variety of capacitively coupled keyboards has previously been developed. In general, these keyboards utilize a pair or more of conductive plates or "pads" which are electrically insulated from one another. One such plate may have an A.C. signal imposed on it, which signal is coupled to another plate (or pad) by an intermediate, movable coupling plate. The coupling plate is generally moved into operative position or away from operative position by a key actuator device. Similarly, sensing circuitry and energizing or driving circuitry for utilizing such capacitive coupling keyboards has been developed and applied in numerous devices currently available. While these prior art devices have generally taken advantage of the simplicity of constructing capacitively coupled keyboards and of assembling them, they have all relied on existing types of circuitboard technology for constructing the substrate or circuitboard on which are carried the various conductive lines and capacitively coupled plates or pads which cooperate with the coupling member just discussed. Some inherent problems with this technology are that the circuitboards must be maintained in a flat plane so that even contact and repeatable coupling characteristics with the movable coupling member are achieved. Without this precaution, undue signal strength variations may be produced at the output which would be a potential source of erroneous sensing of key actuations in a keyboard. Also, an overlying insulator of carefully controlled thickness must usually be applied over the completed conductive patterns on a circuitboard in order to shield the conductive pattern from the corrosive elements in the atmosphere and to provide a dielectric interface to produce capacitive coupling with the coupling member when it is brought into proximity with the adjacent conductive plates on the circuitboard. The addition of this dielectric layer over the conductive plates on the circuitboard is not only an extra process step in the manufacture of keyboards, but it must be carefully controlled so that the thickness is even and smooth, and so that the resulting circuitboard will remain flat on its surface.

Still further difficulties arise with the use of this technology in placing the necessary conductive lines to and from numerous conductive plates disposed on the surface of the circuitboard. The physical constraints of area for placing coplanar conductive plates or pads, together with their necessary conductive lines interconnecting with them the drive and sense electronic systems, has presented a significant problem, most particularly for the so-called "matrix" keyboards in which M x N crosspoints exist. The solution to the problem of placing all of the necessary conductive lines and pads within a given area for a circuitboard has generally been through the use of through-plated holes, as is well-known in the circuitboard manufacturing technology. By the use of through-plated holes, conductive patterns may be placed on both sides of a circuitboard and interconnected to accommodate matrix arrays. Typically, the conductive plates or pads for the drive and the sense electronics (which are connected to the corresponding drive or sense conductive circuits on the same or opposite side of the circuitboard) have all been placed on the same side of the circuitboard. The corresponding sense or drive conductors have been placed on the opposite side of the circuit board. This is a satisfactory approach in general, but leads to high cost and many processing defects because of the difficulties inherent in producing consistently good through-plated holes with complicated circuit patterns on both sides of a circuitboard. Continuity of the plated copper or other conductive materials must be maintained on two surfaces of a circuitboard and, wherever a through-plated hole exists, through the circuitboard. This poses significant processing problems to the technology of circuitboard manufacture in general and usually results in a relatively high cost circuitboard structure, due to the numerous processing steps required to assure a sound final product.

As will be readily appreciated by those familiar with this technology, a technique for the avoidance of through-plated holes and, generally, of the photo etching process used with conductive circuitboards, would be highly appreciated, particularly if the space savings resulting from the use of two-sided circuit technology could still be preserved while the use of through-plated holes is avoided. As is readily apparent, the use of two-sided circuitry is an absolute necessity where an $M \times N$ matrix of greater than $2 \times 2$ is required and where, in addition, the M and N conductors must be brought out to the edges of the circuitboard for connection to the using electronic systems, since it is not possible, without resort to complicated insulated crossings of conductors, to bring M columns and N rows out to the edges of a circuitboard without having at least one M and N cross each other. Therefore, a technique which allows crossing, such as two-sided circuitry, but without the complications of insulated single-sided circuits is a highly desirable goal.

OBJECTS OF THE INVENTION

In light of the foregoing and other difficulties associated with the prior art, it is an object of this invention to provide an improved circuit substrate device for utilization with capacitive matrix keyboard technologies.

The foregoing and other objects, features and advantages of the invention will be apparent from the following more particular description of a preferred embodiment of the invention, as illustrated in the accompanying drawings.

SUMMARY OF THE INVENTION

The foregoing objects of the invention are met advantageously in the present invention by utilizing flexible dielectric films (or one flexible film and one rigid substrate) with printed circuitry patterns thereon together with a dielectric film intermediate layer for separating the conductive surfaces carried by the flexible films (or by a film and a substrate). A "sandwich" structure is produced in which the external surfaces are the dielectric film and intermediate internal surfaces carry the printed circuitry. The circuitry on one film is separated from the corresponding circuitry on an opposing flexible film or substrate by an intermediate dielectric layer. This structure results in the elimination of through-plated holes, produces the effect of reduced surface area by the use of a two-sided matrix circuit technology, and provides for easy maintenance of circuit substrate flatness and integrity which is desirable in the capacitive circuitboard technology and particularly for use with key actuators in capacitive keyboards.

For purposes of better understanding the technology associated with capacitive matrix keyboard, reference is made to U.S. Pat. No. 3,786,497, which details the electronic circuitry systems utilized in a capacitively coupled matrix electronic keyboard, to U.S. patent application Ser. No. 183,583, now abandoned, which details a key actuator suitable for use, for example, with the electronic circuitry of the aforementioned U.S. patent, and to patent application Ser. No. 203,390, now defensive publication T904,008, which details an amplifying circuit and shows the general circuit arrangement for a capacitive matrix circuitboard used with a capacitive keyboard. The foregoing patent and patent applications are hereby incorporated by reference as teachings of the general art and of specific embodiments in which the present invention finds utility as the capacitive circuitboard required in the technology of capacitive matrix keyboards in general.

Figure 1A:
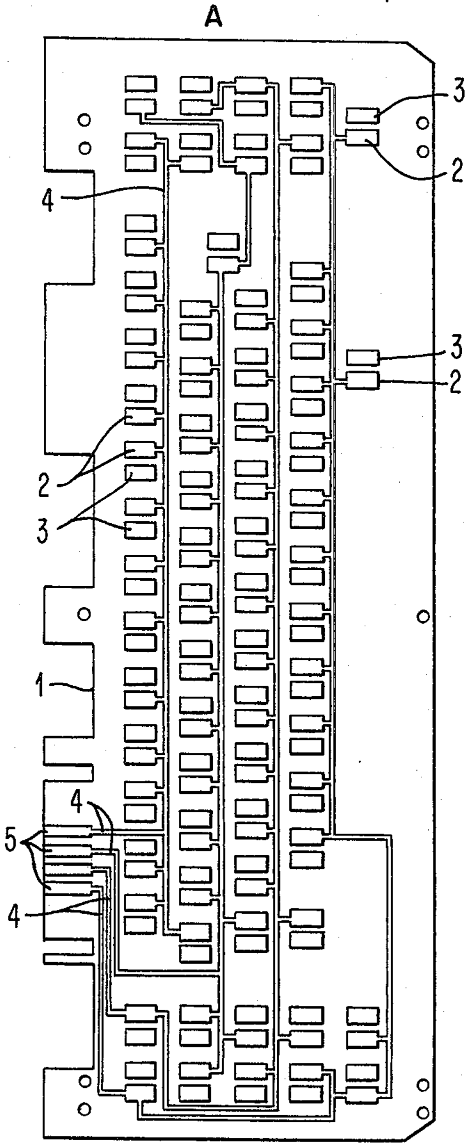
FIG. 1A illustrates a conductive pad pattern of corresponding pairs of conductive plates together with their associated conductors and connectors for one half of the sandwich construction of the preferred matrix embodiment.

Turning now to FIG. 1A, a flexible circuit substrate sandwich member is illustrated. Flexible substrate 1 is preferably made of dielectric plastic material approximately two thousandths of an inch in thickness. In the preferred form, Mylar (a Trademark of the E. I. duPont de Nemours Corp.) film is utilized, although a wide variety of dielectric film materials is available, any one of which could suitably be utilized for the substrate material 1. On substrate film 1, a plurality of printed conductive ink or etched copper conductive capacitive plates or pads 2 are illustrated, as well as a plurality of conductive pads 3 in coplanar adjacent relationship to the pads 2. The coplanar conductive pads 2 are connected by conductors 4 to one another to form separate rows or columns (M or N) which are connected, respectively, to terminal connections 5. The embodiment illustrated will be discussed for a matrix of capacitively coupled key pads 2 and 3 in which a complete keyboard is constructed with rows (N) and columns (M) of key positions. (M and N are whole numbers.) In this type of keyboard, plural pairs of pads 2 and 3 (each representing a given key position on substrate 1) are used in the most usual embodiment. Reference may be had to the aforementioned U.S. patent for explanation of how capacitive matrix keyboards may be constructed and utilized.

Figure 1B:
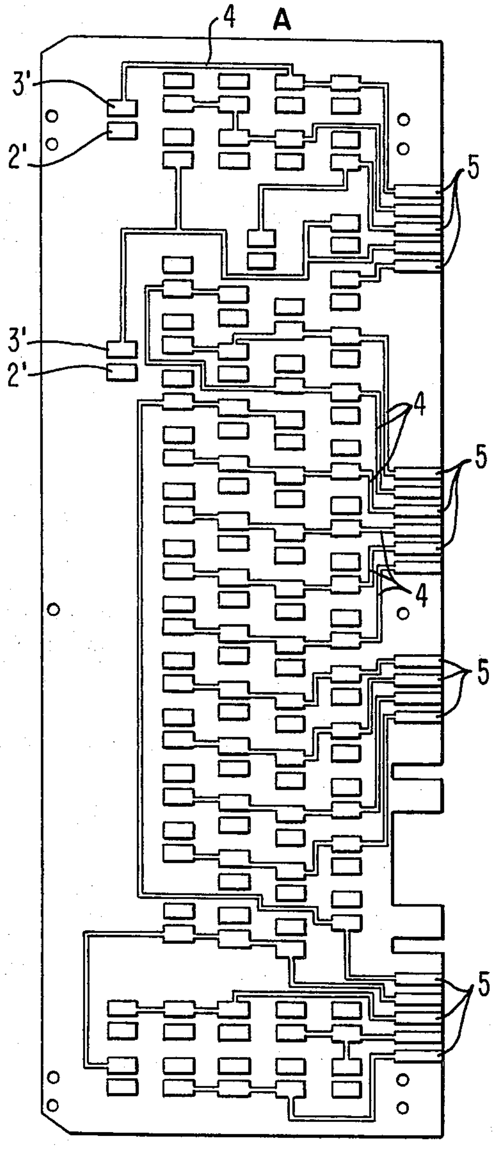
FIG. 1B illustrates the opposing pattern of corresponding pairs of conductive plates with their associated conductors and connectors for the second half of the sandwich construction of the preferred matrix embodiment.

In FIG. 1B a mirror image of the embodiment of FIG. 1A (insofar as the location of capacitive pads 2 and 3 is concerned) is shown. In FIG. 1B, individual pads 3' are interconnected by conductors 4 into respective rows and columns which terminate in connectors 5 as shown. It will be observed that the corresponding coplanar pads 2' are not connected, which is the opposite condition of that shown in FIG. 1A for pads 2. The substrate 1 for this lower half of the assembly may be flexible or rigid. If it is rigid, it produces support for the upper, flexible film 1 and the thickness of this lower substrate is immaterial.

It will be easily appreciated by those familiar with the technology, that the various conductive lines 4 and pads 2, 3, 2' and 3', as well as connecting pads 5 may all be formed of a conductive ink which is printed or screened in place. In the alternative, these may be constructed using conventional photo etching and plating processes long used with plated metal circuit manufacturing techniques. Also, as has already been alluded to, one of the circuit substrates may be rigid while the other is made flexible to conform easily to the rigid substrate's surface irregularities. If this is done, usually the top layer will be the flexible one and the bottom layer will be rigid to provide structural rigidity to the assembly. In the preferred embodiment, a silver bearing ink material is preferably utilized since the printing techniques thereby permitted are simpler, easier and less costly than the alternative photo etching and metal plating technologies, as will be readily understood.

The two halves of the capacitive circuitboard, with matching holes to facilitate accurate alignment of corresponding areas, are illustrated in FIGS. 1A and 1B. The two halves will be assembled together with their respective ends A adjacent one another and with the circuit bearing surfaces facing each other. These two halves are assembled on opposite sides of a dielectric insulator and separator film, not shown in FIGS. 1A and 1B. The resulting structure, in schematic form, is illustrated in FIG. 2.

Figure 2:
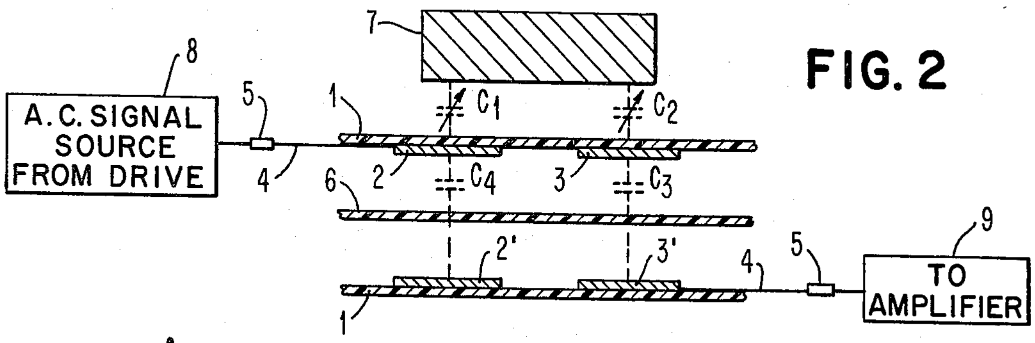
FIG. 2 is a cross-sectional schematic drawing of a completed matrix sandwich construction made by placing FIGS. 1A and 1B in conjunction with an intermediate layer of material and also shows, in schematic form, the associated drive, sense and coupling elements of a capacitive keyboard.

Turning to FIG. 2, a schematic diagram of a completed sandwich made up of separate circuit bearing substrate films 1, each of which carries adjacent conductive pads 2, 3, or 2' and 3', respectively, together with conductors 4 and connectors 5 as shown. An intermediate dielectric film layer 6 is sandwiched between the conductive surfaces, respectively, of films 1 and would be in physical contact with the films 1 in the final assembly, but they are illustrated in FIG. 2 as being separated for purposes of simplicity in understanding the invention. Also shown in FIG. 2 in schematic form, is a conductive coupling member 7 which would be brought down (by means not shown) into contact with the upper surface of film 1 (which carries conductive pads 2 and 3) to provide a capacitive coupling relationship between given pads 2 and 3. AC signals imposed on a given pad 2 from an AC signal source 8 are capacitively coupled through the conductive member 7 to the adjacent capacitive pad 3. Also shown, in general schematic form, is a sense amplifier 9 which would be conducted via wires or cables (not shown specifically) to the individual terminations 5 of the conductive lines 4 which interconnect the various capacitive pads 3' on lower substrate 1.

It will be immediately appreciated that AC signals appearing on a given capacitive coupling pad 2 may be coupled via the presence of conductive member 7 through what is, effectively, a variable capacitor consisting of conductive pad 2, dielectric film 1, and conductive member 7, to a second, effective capacitor consisting of conductive member 7, dielectric film 1, and a given capacitive pad 3. These two capacitances, which exist when member 7 is in coupling relationship, i.e., contact with film 1, are illustrated schematically as variable capacitances C1 and C2. A third capacitance, which is fixed, is created by the corresponding capacitive pads 3 and 3′ on opposite dielectric films 1 with the intermediate dielectric film 6. This is illustrated as capacitance C3 in FIG. 2. A fourth capacitive couple also exists but is not utilized in the present embodiment and is illustrated in dotted lines as capacitance C4 between corresponding pads 2 and 2′. Correspondence, as used herein, thus includes an alignment of pads 2—2′, 3—3′ in vertical overlying relationship.

Preferably, the interspacing dielectric layer 6 would be an insulating sheet of the aforementioned Mylar (Trademark of the E. I. duPont de Nemours Corp.) material coated on two sides with an adhesive so that, on final assembly, the corresponding conductive pads 2 and 2′, 3 and 3′ carried on their respective films or films and substrates 1 will be held in vertical and horizontal alignment with each other in a fixed relationship. The finally assembled capacitive circuit consisting of the films 1 and the circuitry thereon, with the interspacing dielectric and adhesive 6, results in a flexible, thin, doubly insulated, (i.e., dielectric on both exterior surfaces) capacitively coupled circuit through which AC signals may be propagated whenever a given coupling conductor member 7 is placed in proximity to a given pair of pads 2 and 3, or 2′ and 3′ adjacent one surface of the assembly as illustrated. The flexible nature of the completed circuit substrate assembly lends itself well to the maintenance of flatness which is required for the accurate coupling of signals through conductive member 7 since the flexible assembly may be placed over a flat, rigid support plate or substrate not shown. In the alternative, the lower substrate may itself be rigid to provide this support and flatness as was previously pointed out.

Preferably, the completed sandwich of circuit bearing substrates and dielectric inner layer 6 with adhesive on both sides thereof, is achieved by pressing the elements together in proper relationship to one another using flat platens so as to exclude all air and moisture from the conductive patterns. A sealed structure results because of the use of adhesive on both sides of interlayer 6 and because the circuitry is carried on the inside surface of the films (or film and substrate) 1 in the assembled sandwich. This results in providing, in a single manufacturing step, the effect of carefully cleaning and sealing the surface of an ordinary rigid circuitboard with, for example, a copper pattern on top of it with a coating of dielectric material but without the inherent difficulties of maintaining flatness, integrity, assuring evenness of coating and thoroughness of cleansing, etc., normally associated therewith. Also, as is quite clear from FIG. 2, there are no physical through connections from one circuit substrate film 1 to the other; rather, AC signals are coupled capacitively through capacitance C3 from one substrate to the other. The total area reduction which is brought about by the normal use of two-sided matrix circuit substrates previously alluded to is provided in this structure, but without the use of through-plated holes or the expensive processing associated therewith.

As a specific embodiment, the individual film substrates 1 would be made typically of two thousandths inch thick dielectric material such as Mylar, a registered trademark of the E. I. duPont de Nemours Corp.). The key pad conductive art work for the conductive or capacitive pads 2, 3, 2′ and 3′ the conductive lines 4 and the contacts 5 would be applied by a printing or silk screening process in a conductive ink, such as one containing silver. Typically, the individual capacitive key pads are approximately 0.2 by 0.5 inches and two of them adjacent one another can be placed in a one-half inch square spaced at approximately three-quarters inch on centers. The capacitances C1 and C2 illustrated in FIG. 2 are the result of the dielectric characteristic of the flexible film 1 on top and of any air gap introduced between the coupling plate 7 and the top surface. When the conductor 7 is resting on the top surface of film 1, the capacitance of C1 and C2 in series is usually approximately 11pf. When the coupling number 7 is raised or removed from contact, the capacitance generally drops to less than 1pf. The capacitance of capacitor C3 coupling signals from the top film through dielectric 6 into the bottom layer (which may be flexible or rigid) is typically around 45 pf. Because the capacitance of C3 is in series with 11 pf coupling capacitance, the net capacitance is reduced to approximately 9pf. This, however, is more than adequate for reliable operation of normal sensing and drive circuits which can accurately detect changes of less than a picofarad.

The various conductive pads of capacitive coupling pads on the various substrates 1 and made utilizing a conductive ink that has a relatively high resistance, such as 2 ohms per square, when compared to the usual circuitry with virtually no resistance. This is not a significant problem except for DC currents. Since DC currents are not used in the area of the various key coupling pads, the series resistance has negligible effect.

ADVANTAGES

As will be readily apparent to those skilled in the art, the elimination of through-plated holes and the achievement of the general effect of utilizing two-sided matrix circuitry is quite desirable, especially with the simple manufacturing technique that is made possible. By the reduction in assembly complexity, since only three basic parts are utilized, (two of which are virtually mirror images of one another except for conductive interconnections on given films) the cost of the finished product is substantially reduced and the reliability of producing completed cirucit assemblies should be significantly increased because of use of a more reliable circuit fabricating technology.

While the invention has been particularly shown and described with reference to a preferred embodiment thereof, it will be understood by those skilled in the art that changes in form and detail may be made therein without departing from the spirit and scope of the invention.

What is claimed is:

1. Capacitively coupled circuitboard apparatus, comprising:

a first, flexible, sheet of dielectric material having a first electrically conductive pattern comprising a plurality of adjacent areas of conductive material, said first pattern being on a first surface of said first sheet of dielectric material;

means for connecting at least one of said electrically conductive areas of said first pattern, said connecting means being connected to a source of alternating current voltage, at least one adjacent area of said conductive material of said first pattern being insulated from said alternating current source of voltage by an intervening area of said dielectric material;

a second sheet of dielectric material having, on a first surface thereof, a second pattern of electrically conductive material comprising a plurality of adjacent areas;

at least one of said areas of said second conductive pattern having means for connecting it to an output terminal;

a third, flexible, sheet of dielectric material;

said first, second, and third sheets of material overlying one another in substantially continuous contact with one another in an order in which said third sheet lies between said first and second sheets, with said first and second patterns of conductive material on said first and second sheets, respectively, being in contact with opposite sides of said third sheet;

means for holding said first and second sheets in alignment with one another so that corresponding areas of said conductive material patterns are opposite one another with said at least one area of said first pattern which is insulated from said alternating current source being opposite said at least one electrically conductive area on said second sheet having means for connecting it to said output terminal.

2. Apparatus as described in claim 1, further comprising:

means for holding said first, second and third sheets in contact with one another in said order so that a plurality of corresponding areas of said first and second patterns of conductive material are in vertical alignment with each other and form capacitances with each other at said corresponding and aligned areas thereof.

3. Capacitively couplable circuit apparatus, comprising:

a first, flexible, sheet of dielectric material having a first electrically conductive pattern comprising a plurality of adjacent areas of conductive material, said first pattern being on a first surface of said first sheet of dielectric material;

at least one of said electrically conductive areas of said first pattern having means for connecting it to a source of alternating current voltage and at least one adjacent area of said conductive material being insulated from said alternating current voltage by an intervening area of said dielectric material;

a second sheet of dielectric material having on a first surface thereof, a second pattern of electrically conductive material comprising a plurality of adjacent areas;

at least one of said areas of said second pattern having means for connecting it to an output terminal;

a third, flexible, sheet of dielectric material;

said first, second, and third sheets overlying one another in substantially continuous contact with one another in an order so that said third sheet lies between said first and second sheets, said first and second patterns of conductive material on said first and second sheets, respectively, being in contact with opposite sides of said third sheet;

means for holding said first and second sheets in alignment with one another so that corresponding areas of said conductive material patterns are opposite one another with said at least one area of said first pattern which is insulated from said alternating current source being opposite said at least one electrically conductive area on said second sheet having said means for connecting it to said output terminal; and a means for conducting electrical current;

said conducting means being placed in proximity to said first sheet in alignment with at least one of said areas which is connected to said alternating current source of voltage by said connecting means and in alignment with at least one of said areas which is isolated from said alternating current source of voltage, said conducting means substantially overlying said two areas on said first sheet and being on the side of said first flexible dielectric sheet which is opposite the side on which said first pattern of electrically conductive material is placed, said conducting means capacitively coupling said alternating current voltage from said area connected therewith, through said conducting means, to said adjacent conductive area of said first pattern which is insulated from alternating current voltage by said intervening area of said dielectric material.

4. Apparatus as described in claim 3, wherein:

said first and second patterns of conductive material form an M × N crosspoint matrix of conductors, where M and N designate rows or columns in a matrix and are whole numbers, each said M conductor having means for connecting it to said source of alternating current voltage and each said N conductor having means for connecting it to said output terminal.

5. Apparatus as described in claim 4, wherein:

all of said M conductors are on said first flexible dielectric sheet and all of said N conductors are on said second dielectric sheet.

* * * * *